US006112293A

United States Patent [19]
Witt

[11] Patent Number: 6,112,293
[45] Date of Patent: Aug. 29, 2000

[54] PROCESSOR CONFIGURED TO GENERATE LOOKAHEAD RESULTS FROM OPERAND COLLAPSE UNIT AND FOR INHIBITING RECEIPT/EXECUTION OF THE FIRST INSTRUCTION BASED ON THE LOOKAHEAD RESULT

[75] Inventor: David B. Witt, Austin, Tex.

[73] Assignee: Advanced Micro Devices, Inc., Sunnyvale, Calif.

[21] Appl. No.: 09/115,123

[22] Filed: Jul. 14, 1998

Related U.S. Application Data

[60] Provisional application No. 60/065,878, Nov. 17, 1997.

[51] Int. Cl.[7] .................................................. C06F 9/38
[52] U.S. Cl. .......................... 712/216; 712/217; 712/218
[58] Field of Search .............................. 712/216, 23, 214, 712/215, 217, 218, 209, 242, 221, 223, 226; 711/140, 169

[56] References Cited

U.S. PATENT DOCUMENTS

| | | | |
|---|---|---|---|
| 5,539,911 | 7/1996 | Nguyen et al. | |
| 5,557,763 | 9/1996 | Senter et al. | 712/23 |
| 5,630,157 | 5/1997 | Dwyer, III . | |
| 5,664,136 | 9/1997 | Witt et al. . | |
| 5,675,758 | 10/1997 | Sowadsky et al. . | |
| 5,768,610 | 6/1998 | Pflum . | |
| 5,835,968 | 11/1998 | Mahalingaiah et al. . | |
| 5,878,244 | 3/1999 | Witt et al. | 712/218 |
| 5,896,542 | 4/1999 | Iadonato et al. | 712/23 |
| 5,913,048 | 6/1999 | Cheong et al. | 712/215 |
| 5,948,098 | 9/1999 | Leung et al. | 712/221 |
| 5,961,634 | 10/1999 | Tran | 712/218 |
| 5,961,639 | 10/1999 | Malick et al. | 712/242 |
| 5,974,526 | 10/1999 | Garg et al. | 712/23 |

FOREIGN PATENT DOCUMENTS

| | | |
|---|---|---|
| 0 410 105 | 1/1991 | European Pat. Off. . |
| 0 709 769 | 5/1996 | European Pat. Off. . |
| WO 93/20505 | 10/1993 | WIPO . |

OTHER PUBLICATIONS

Annex to Form PCT/ISA/206 relating to the results of the partial international search for International Application No. PCT/US 98/22030 mailed Mar. 3, 1999.

International Search Report for Application No.PCT/US 98/22030 mailed Jul. 12, 1999.

*Primary Examiner*—Meng-Ai T. An
*Assistant Examiner*—Walter Benson
*Attorney, Agent, or Firm*—Conley, Rose & Tayon, P.C.; Lawrence J. Merkel

[57] ABSTRACT

A processor includes a lookahead address/result calculation unit which is configured to receive operand information (either the operand or a tag identifying the instruction which will produce the operand value) corresponding to the source operands of one or more instructions. If the operands are available, lookahead address/result calculation unit may generate either a lookahead address for a memory operand of the instruction or a lookahead result corresponding to a functional instruction operation of the instruction. The lookahead address may be provided to a load/store unit for early initiation of a memory operation corresponding to the instruction. The lookahead result may be provided to a speculative operand source (e.g. a future file) for updating therein. A lookahead state for a register may thereby be provided early in the pipeline. Subsequent instructions may receive the lookahead state and use the lookahead state to generate additional lookahead state early. On the other hand, the subsequent instructions may receive the lookahead state and hence may be prepared for execution upon dispatch to an instruction window (as opposed to waiting in the instruction window for execution of the prior instruction). In one embodiment, the processor also includes an operand collapse unit configured to collapse the lookahead results into subsequent, concurrently decoded instructions (intraline dependencies). Additionally, the operand collapse unit may be configured to collapse a compare instruction into a subsequent branch instruction which depends upon the result of the compare.

21 Claims, 9 Drawing Sheets

| Addressing Mode | Mux 1 | Mux 2 |
|---|---|---|
| Displacement Only | 0 | 0 |
| Source1 + Optional Disp. | Source1 | 0 |
| Source1 + Source2 + Optional Disp. | Source1 | Source2 |
| ESP + Optional Disp. | Lookahead ESP | Constant |
| EBP + Optional Displacement | Constant | Lookahead EBP |

| Arithmetic Operation | Mux 1 | Mux 2 |
|---|---|---|
| Add/Subtract | Source1 | Source2/0 |
| Increment/ Decrement | Source1 | 0 |
| Register Move | 0 | Source2 |

PROCESSOR CONFIGURED TO GENERATE LOOKAHEAD RESULTS FROM OPERAND COLLAPSE UNIT AND FOR INHIBITING RECEIPT/EXECUTION OF THE FIRST INSTRUCTION BASED ON THE LOOKAHEAD RESULT

This Application claims benefit of priority to the Provisional Application Ser. No. 60/065,078, entitled "High Frequency, Wide Issue Microprocessor" filed on Nov. 17, 1997 by Witt. The Provisional Application is incorporated herein by reference in its entirety.

BACKGROUND OF THE INVENTION

1. Field of the Invention

This invention is related to the field of processors and, more particularly, to parallelizing instruction execution within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized. In order to increase the average number of instructions dispatched per clock cycle, processor designers have been designing superscalar processors which employ wider issue rates. A "wide issue" superscalar processor is capable of dispatching (or issuing) a larger maximum number of instructions per clock cycle than a "narrow issue" superscalar processor is capable of dispatching. During clock cycles in which a number of dispatchable instructions is greater than the narrow issue processor can handle, the wide issue processor may dispatch more instructions, thereby achieving a greater average number of instructions dispatched per clock cycle.

Unfortunately, supporting wider issue rates generally requires a larger amount of execution hardware within the processor. If sufficient execution hardware is not provided, then the instruction throughput of the processor may suffer even though the processor is capable of issuing a large number of instructions concurrently. The execution hardware may occupy a substantial amount of semiconductor substrate area, increasing the overall die size of the processor and hence its cost.

Additionally, many instructions are relatively simple instructions which could be handled by simple execution hardware. For example, move instructions which specify only register operands (i.e. a move from a source register to a destination register) is a simple instruction requiring almost no hardware to execute. Move instructions having a memory and a register operand involve an address generation but relatively little additional hardware. Furthermore, additive instructions (e.g. add/subtract/increment/decrement) having register operands are relatively simple instructions as well. The simpler instructions may be relatively frequent within common code sequences as well. However, the execution hardware must also be capable of executing the more complex instructions. Some superscalar processors have attempted to provide less costly execution hardware by providing both complex and simple execution units and controlling the issue of instructions to the execution units such that the simple execution units receive only simple instructions while the more complex units receive either simple instructions or complex instructions. While such a strategy may reduce the area occupied by the execution hardware, the issue logic becomes more complex. The complex logic may occupy more area, or may become a clock cycle time limiter. Accordingly, a more efficient method for handling the mix of simple and complex instructions is desired.

In order to support higher clock frequencies (i.e. shorter clock cycle times), superscalar processors have been employing longer pipelines (i.e. pipelines including more stages) as well as wider issue rates. While longer pipelines may result in the achievement of higher clock frequencies, the longer pipelines present additional design challenges as well. More particularly, as greater numbers of instructions may be fetched and placed into the pipeline prior to previous instructions completing execution, additional forwarding hardware may be required to support parallel execution. For example, more instructions may progress beyond the operand fetch stage prior to the execution of previous instructions. If these instructions are dependent upon the previous instructions, the operands for those instructions may not be available when the instructions reach the operand fetch stage. These instructions may be allowed to progress to subsequent pipeline stages if forwarding hardware is provided to route the operands to the instructions as they progress through the pipeline toward execution. Unfortunately, the forwarding hardware may be costly in terms of area and complexity as well. A more efficient solution for providing operands to dependent instructions is therefore desired.

As used herein, the term "dependency" is used to refer to relationship between a first instruction and a subsequent second instruction in which the second instruction requires execution of the first instruction prior to execution of the second instruction. For example, the second instruction may include a source operand which is generated via execution of the first instruction. Generally, an operand is a value operated upon during execution of an instruction. The operands for a particular instruction are located via operand specifiers encoded into the instruction. For example, certain operands may be stored in registers employed within the processor. A register operand specifier encoded into the instruction selects the particular register storing the operand. The register operand specifier may also be referred to as a register address or a register number. On the other hand, other instructions may specify a memory operand stored in a memory location within a main memory to which the processor is coupled. The memory address is specified via operand specifiers as well. For example, the instruction may include a displacement which identifies the memory location storing the memory operand. Other instructions may include address operand specifiers which specify register operands used to form the memory address. An operand may be a source operand if the operand is an input value for the instruction. An operand may be a destination operand if the operand is the result of the instruction. The destination operand specifier specifies the storage location in which the result of executing instruction is to be stored.

SUMMARY OF THE INVENTION

The problems outlined above are in large part solved by a processor in accordance with the present invention. The processor includes a lookahead address/result calculation unit which is configured to receive operand information (either the operand or a tag identifying the instruction which will produce the operand value) corresponding to the source operands of one or more instructions. If the operands are available, lookahead address/result calculation unit may generate either a lookahead address for a memory operand of the instruction or a lookahead result corresponding to a functional instruction operation of the instruction. The lookahead address may be provided to a load/store unit for early initiation of a memory operation corresponding to the instruction. The lookahead result may be provided to a speculative operand source (e.g. a future file) for updating therein. Advantageously, a lookahead state for a register may be provided early in the pipeline. Subsequent instructions may receive the lookahead state and use the lookahead state to generate additional lookahead state early. On the other hand, the subsequent instructions may receive the lookahead state and hence may be prepared for execution upon dispatch to an instruction window (as opposed to waiting in the instruction window for execution of the prior instruction).

The processor may achieve more efficient forwarding in a variety of fashions. For example, many instructions may receive lookahead results upon operand fetch, and hence need not wait for subsequent forwarding of operands. Furthermore, since some instruction operands may be completed in the lookahead address/result calculation unit, fewer functional units may be required to support a wide issue rate. Accordingly, fewer forwarding buses may be implemented (reflecting the fewer functional units). Additionally, performance may be increased by providing lookahead operands for instructions prior to the instructions producing the lookahead operands reaching the execution stage of the processor pipeline.

In one embodiment, the processor also includes an operand collapse unit configured to collapse the lookahead results into subsequent, concurrently decoded instructions (intraline dependencies). Additionally, the operand collapse unit may be configured to collapse a compare instruction into a subsequent branch instruction which depends upon the result of the compare. Advantageously, compare/branch combinations may occupy a single functional unit.

Broadly speaking, the present invention contemplates a processor comprising an intraline dependency check unit, a lookahead calculation unit, an operand collapse unit, and one or more instruction windows. Coupled to receive a plurality of operand specifiers corresponding to a line of instructions, the intraline dependency check unit is configured to determine dependencies between instructions within the line of instructions by comparing the plurality of operand specifiers. Coupled to receive one or more operands specified by the plurality of operand specifiers, the lookahead calculation unit is configured to calculate a lookahead result corresponding to a first instruction within the line of instructions if each operand used by the first instruction to generate the lookahead result are within the one or more operands. Coupled to the lookahead calculation unit and the intraline dependency check unit, the operand collapse unit is configured to provide the lookahead result as an operand of a second instruction within the line of instructions. The operand collapse unit may provide the lookahead result as the operand responsive to: (i) an indication from the lookahead calculation unit that the lookahead result is valid, and (ii) an indication from the intraline dependency check unit that the second instruction is dependent upon the first instruction. Coupled to the operand collapse unit, the instruction windows are configured to store instructions until corresponding operands are provided and to subsequently select the instructions for execution. The operand collapse unit is configured to signal the instructions windows to inhibit execution of at least a first instruction operation of the first instruction represented by the lookahead result if the lookahead result is valid.

The present invention further contemplates a processor comprising an operand collapse unit and one or more instruction windows. The operand collapse unit is coupled to receive a plurality of operands corresponding to a line of instructions. The operand collapse unit is configured to provide one or more of the plurality of operands corresponding to a first instruction within the line of instructions as operands of a second instruction within the line of instructions responsive to: (i) the first instruction being a compare instruction, (ii) the second instruction being a conditional branch instruction, and (iii) the second instruction being consecutive to the first instruction. Coupled to the operand collapse unit, the instruction windows are configured to store instructions until corresponding operands are provided and to subsequently select the instructions for execution. The operand collapse unit is configured to signal the instructions windows to inhibit receipt of first instruction if: (i) the first instruction is a compare instruction, (ii) the second instruction is a conditional branch instruction, and (iii) the second instruction is consecutive to the first instruction.

Moreover, the present invention contemplates a method for executing a line of instructions in a processor. The line of instructions is decoded to detect a plurality of operand specifiers. Destination operand specifiers of each instruction within the line of instructions are compared to source operand specifiers of each subsequent instruction a within the line of instructions to detect intraline dependencies. A speculative operand source is read to capture source operands specified by the source operand specifiers. A lookahead result is calculated for a first instruction within the line if the source operands are available in the speculative operand source. An instruction window configured to receive the first instruction is signalled to inhibit execution of at least a first instruction operation of the first instruction which produces the lookahead result if the lookahead result is successfully calculated. The lookahead result is provided to a second instruction within the line of instructions if the comparing indicates a dependency of the second instruction upon the first instruction. The providing is performed prior to storing the second instruction in the instruction window.

The present invention still further contemplates a computer system comprising a processor and an input/output (I/O) device. The processor includes an alignment unit configured to align a line of instructions to a plurality of issue positions, a speculative operand source configured to store speculative operands, an instruction window configured to store instructions until operands are provided for those instructions, and a lookahead/collapse unit. The lookahead/collapse unit is coupled to the speculative operand source, the instruction window, and the alignment unit, and is configure to read operands from the speculative operand source responsive to the line of instructions received from the alignment unit. The lookahead/collapse unit is configured to generate a lookahead result corresponding to a first instruction within the line of instructions responsive to the operands. The lookahead/collapse unit is further configured to update the speculative operand source with the lookahead result, and is further configured to forward the lookahead result to a second instruction within the line of instructions which is dependent upon the first instruction. The lookahead/collapse unit is configured to signal the instruction window to inhibit execution of at least a first instruction operation of the first instruction which produces the lookahead result. Coupled to the processor, the I/O device is configured to communicate between the computer system and another computer system to which the I/O device is coupled.

BRIEF DESCRIPTION OF THE DRAWINGS

Other objects and advantages of the invention will become apparent upon reading the following detailed description and upon reference to the accompanying drawings in which.

Figure 1:
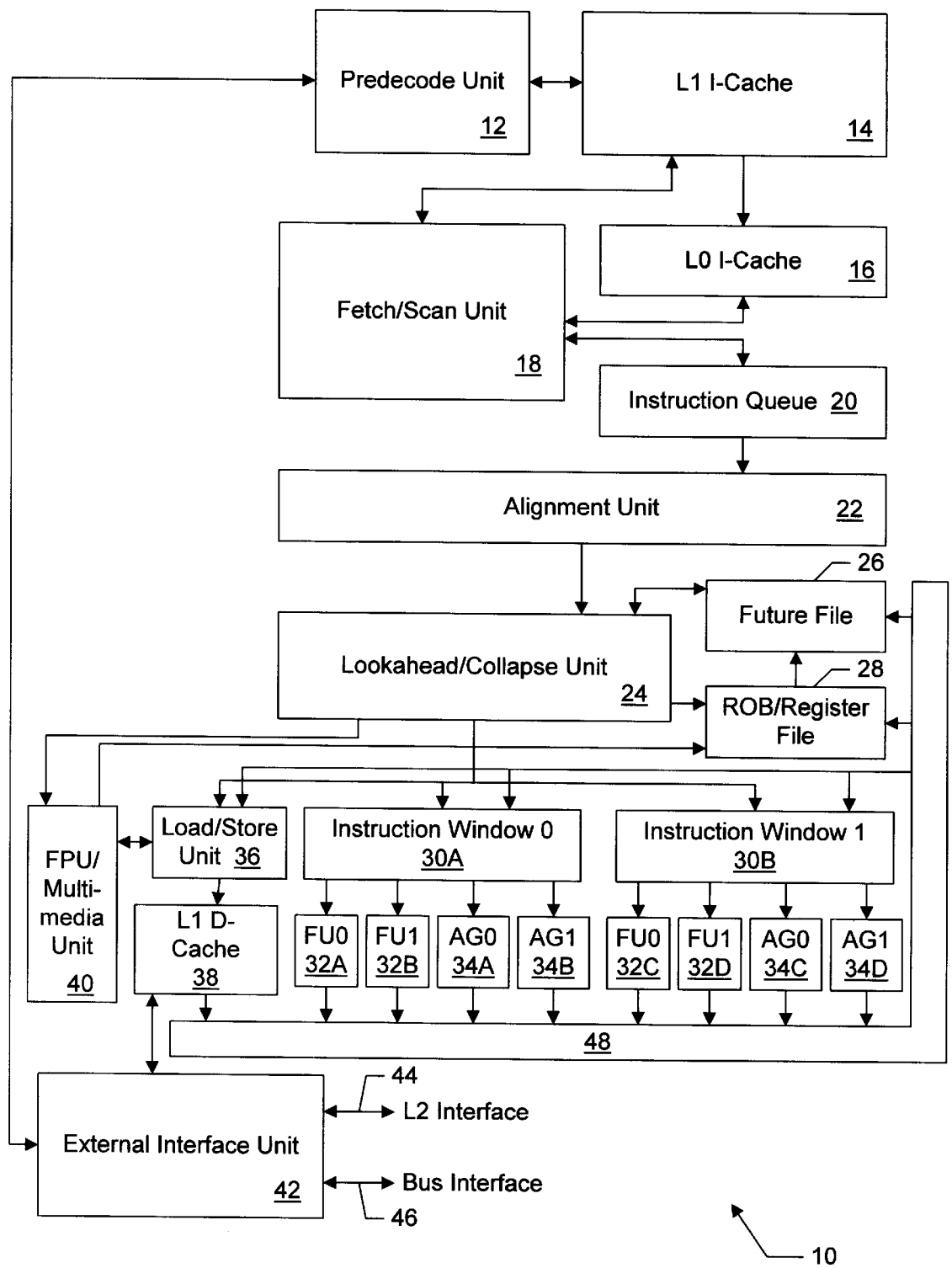
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a lookahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multimedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In the embodiment of FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to lookahead/collapse unit 24. Lookahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. First instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Generally speaking, lookahead/collapse unit 24 is configured to generate lookahead results for certain instructions prior to the dispatch of those instructions for execution. A lookahead result is generated for the certain instructions if the operands used to produce the result are available within future file 26 upon operand fetch therefrom. An operand is available within future file 26 if the value is valid within future file 26 (as opposed to being a result queue tag identifying the instruction which is to produce the operand as a result upon execution). If a lookahead result is successfully generated, the result is provided to future file 26 for storage and is provided to any dependent instructions within the same "line" of instructions (i.e. concurrently decoded with the instruction). Advantageously, speculative results may become available for subsequent instructions earlier in the pipeline. Hence, lookahead results may be calculable for the subsequent instructions. Additionally, forwarding may be more efficient as the forwarding is more frequently accomplished through future file 26. Accordingly, forwarding hardware may be reduced. Still further, the amount of execution hardware employed within processor 10 may be reduced while still supporting a wide issue rate because results are generated outside of the execution hardware for the certain instructions.

In one embodiment, lookahead/collapse unit 24 is configured to generate a lookahead address for instructions having a memory operand. For such instructions, the address generation instruction operation otherwise performed by one of address generation units 34 may be performed by lookahead/collapse unit 24. Accordingly, load/store unit 36 may receive the address earlier in the pipeline than would be otherwise achievable. If the instruction specifies an additive instruction operation or a register—register move and does not include a memory operand, lookahead/collapse unit 24 may generate a lookahead result. Accordingly, the functional instruction operation which would otherwise be executed by one of functional units 32 is performed by lookahead/collapse unit 24 earlier in the pipeline.

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses at which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encode s this limited set of above and below cache lines. Generally, branch instructions having a small displacement field have displacements within a predefined range, whereas larger displacement fields may store values outside the predefined range.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
|---|---|---|
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
|---|---|---|
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note: Remaining displacement byte bits are the offset within the target cache line. Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and fetch or prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. One embodiment of the prefetch algorithm is set forth in more detail below.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries.

Alignment unit 22 is configured to route instructions identified by instruction queue 20 to a set of issue positions within lookahead/collapse unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Lookahead/collapse unit 24 decodes the instructions provided by alignment unit 22. FPU/multimedia instructions detected by lookahead/collapse unit 24 are routed to FPU/multimedia unit 40. Other instructions are routed to first instruction window 30A, second instruction window 30B, and/or load/store unit 36. In one embodiment, a particular instruction is routed to one of first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, lookahead/collapse unit 24 attempts to generate lookahead addresses or execution results for certain types of instructions. Lookahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, lookahead/collapse unit 24 generates lookahead copies of the ESP and EBP registers for each of instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which: (i) includes a memory operand; and (ii) register operands used to form the address of the memory operand are available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) register operands are available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 (i.e. address generations and/or instruction results are generated and load/store unit 36 or future file 26 and the result queue are updated) are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions. Execution results are retired from the result queue in order into the register file included within reorder buffer/register file 28. Additionally, the reorder buffer handles branch mispredictions, transmitting the corrected fetch address generated by the execution of the branch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units.

Future file 26 maintains the speculative state of each architected register as instructions are dispatched by lookahead/collapse unit 24. As an instruction having a register destination operand is decoded by lookahead/collapse unit 24, the tag identifying the storage location within the result queue portion of reorder buffer/register file 28 assigned to the instruction is stored into the future file 26 storage location corresponding to that register. When the corresponding execution result is provided, the execution result stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group). Such a group of instructions is referred to as a "line" of instructions herein.

Instruction windows 30 receive instructions from lookahead/collapse unit 24. Instruction windows 30 store the instructions until the operands corresponding to the instructions are received, and then select the instruction s for execution. Once the address operands of an instruction including a memory operation have been received, the instruction is transmitted to one of the address generation units 34. Address generation units 34 generate an address from the address operands and forward the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and functional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not include any memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may identify execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 load/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
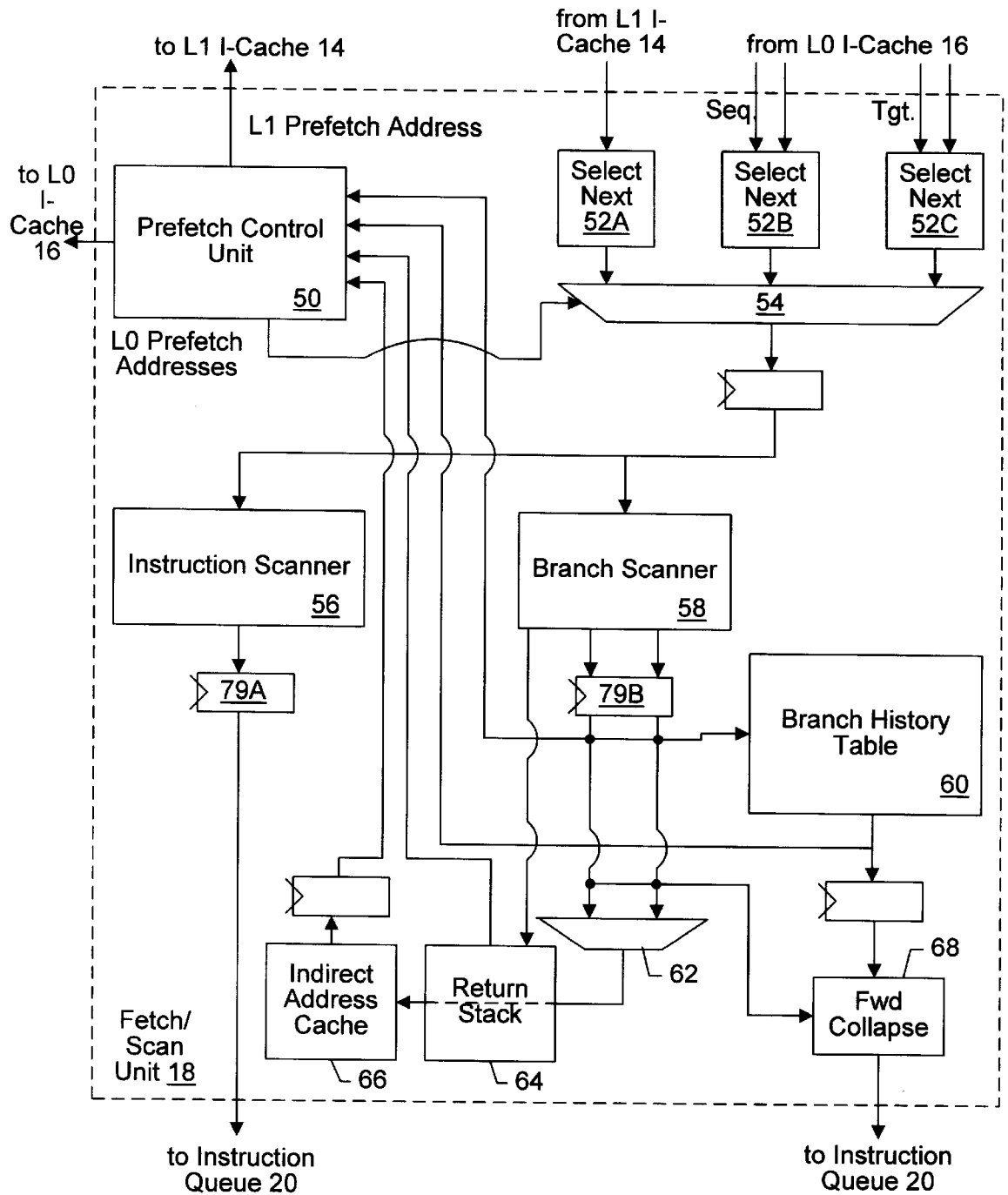
FIG. 2 is a block diagram of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a fetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Fetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20. Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Fetch control unit 50 receives branch prediction information (including target addresses and taken/not taken predictions) from branch scanner 58, branch history table 60, return stack 64, and indirect address cache 66. Responsive to the branch prediction information, fetch control unit 50 generates fetch addresses for L0 I-cache 16 and a fetch or a prefetch address for L1 I-cache 14. In one embodiment, fetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a full run if the offset portion of the prefetch address is near the end of the cache line. It is noted that the fetch cache lines from L0 I-cache 16 may be provided in the same clock cycle as the corresponding addresses are generated by fetch control unit 50, but the prefetch cache line may be a clock cycle delayed due to the larger size and slower access time of L1 I-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. According to one exemplary embodiment, L0 I-cache 16 comprises a fully associative cache structure of eight entries. A fully associative structure may be employed due to the relatively small number of cache lines included in L0 I-cache 16. Other embodiments may employ other organizations (e.g. set associative or direct-mapped).

Fetch control unit 50 selects the instruction run provided by one of select next blocks 52 in response to branch prediction information by controlling instruction select mux 54. As will be explained in more detail below, fetch control unit 50 receives (in the present embodiment) target addresses from branch scanner 58, return stack 64, and indirect address cache 66 early in the clock cycle as well as at least a portion of the opcode byte of the first branch instruction identified by branch scanner 58. Fetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken, then fetch control unit 50 selects the instruction run provided by select next block 52C. On the other hand, if the branch instruction is predicted not taken, then the instruction run selected by select next block 52B is selected. The instruction run provided by select next block 52A is selected if a predicted fetch address missed L0 I-cache 16 in at previous clock cycle and was fetched from L1 I-cache 14. Additionally, the instruction run from L1 I-cache 14 is selected if the instruction run was fetched responsive to a branch instruction have a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to fetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the next instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the to taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken, the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions.

Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to fetch control unit 50 for selection as a target address if a return instruction is detected by branch scanner 58 and fetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In to one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to fetch control unit 50. In one embodiment, indirect address cache 66 may comprise 32 entries.

According to one contemplated embodiment, if indirect address cache 66 detects a miss for a fetch address, indirect address cache 66 may be configured to select a target address to provide from one of the entries. In this manner, a "guess" at a branch target is provided in case an indirect branch instruction is decoded. Fetching from the guess may be performed rather than awaiting the address via execution of the indirect branch instruction. Alternatively, another contemplated embodiment awaits the address provided via execution of the indirect branch instruction.

It is noted that, if an encoded target address is selected, the actual target address may be presented to L0 I-cache 16. Fetch control unit 50 may be configured to precalculate each of the possible above/below target addresses and select the correct address based on the encoded target address. Alternatively, fetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled. If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

Figure 3:
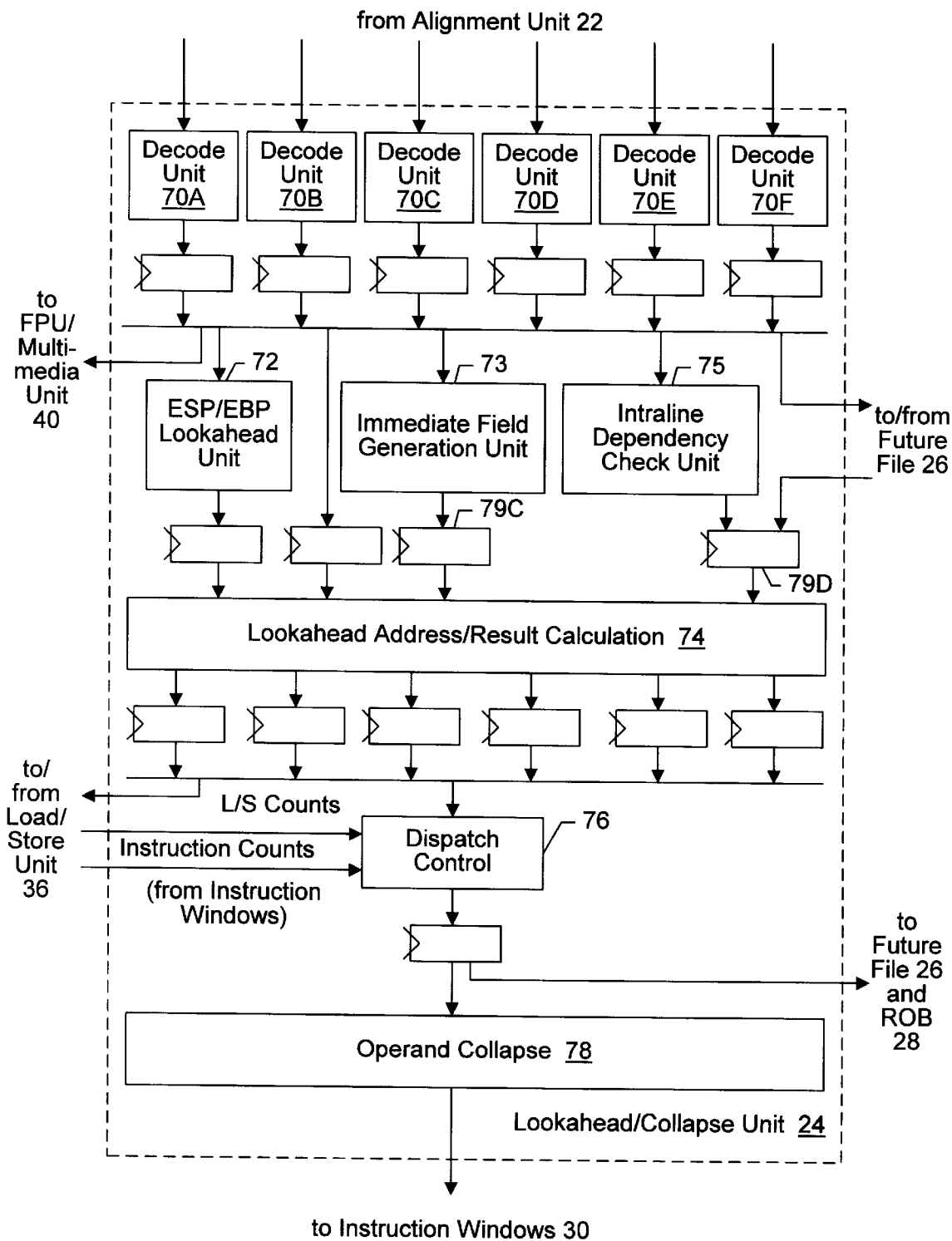
FIG. 3 is a block diagram of one embodiment of a lookahead/collapse unit shown in FIG. 1.

Turning now to FIG. 3, a bock diagram of one embodiment of lookahead/collapse unit 24 is shown. Other embodiments are possible and contemplated. As shown in FIG. 3, lookahead/collapse unit 24 includes a plurality of decode units 70A–70F, an ESP/EBP lookahead unit 72, an immediate field generation unit 73, an intraline dependency check unit 75, a lookahead address/result calculation unit 74, a dispatch control unit 76, and an operand collapse unit 78. Decode units 70A–70F are coupled to receive instructions from alignment unit 22. Decode units 70A–70F are coupled to provide decoded instructions and/or instruction information to FPU/multimedia unit 40, ESP/EBP lookahead unit 72, immediate field generation unit 73, intraline dependency check unit 75, future file 26, and lookahead address/result calculation unit 74. ESP/EBP lookahead unit 72 is coupled to lookahead address/result calculation unit 74, as is future file 26, immediate field generation unit 73, and intraline dependency check unit 75. Lookahead address/result calculation unit 74 is further coupled load/store unit 36 and dispatch control unit 76. Dispatch unit 76 is further coupled to operand collapse unit 78, future file 26, load/store unit 36, and reorder buffer 28. Operand collapse unit 78 is coupled to instruction windows 30.

Each decode unit 70A–70F forms an issue position to which alignment unit 22 aligns an instruction. While not indicated specifically throughout FIG. 3 for simplicity the drawing, a particular instruction remains within its issue position as the instruction moves through lookahead/collapse unit 24 and is routed to one of instruction windows 30A–30B if not completed within lookahead/collapse unit 24.

Decode units 70A–70F route FPU/multimedia instructions to FPU/multimedia unit 40. However, if the FPU/multimedia instructions include memory operands, memory operations are also dispatched to load/store unit 36 in response to the instruction through lookahead address/result calculation unit 74. Additionally, if the address for the memory operations cannot be generated by lookahead address/result calculation unit 74, an address generation operation is dispatched to one of address generation units 34A–34D via instruction windows 30A–30B. Still further, entries within reorder buffer 28 are allocated to the FPU/multimedia instructions for maintenance of program order. Generally, entries within reorder buffer 28 are allocated from decode units 70A–70F for each instruction received therein.

Each of decode units 73A–70F may be configured to provide the opcode and mod r/m bytes of the instruction being decoded therein to ESP/EBP lookahead unit 72. ESP/EBP lookahead unit 72 may determine: (i) whether or not the instruction uses the ESP or EBP registers as a source operand; and (ii) whether not the instruction modifies the ESP/EBP registers (i.e. has the ESP or EBP registers as a destination operand). ESP/EBP lookahead unit 72 generates lookahead information for each instruction which uses the ESP or EBP registers as a source operand. The lookahead information may include a constant to be added to the current lookahead value of the corresponding register and/or an indication of a dependency upon an instruction in a prior issue position. In one embodiment, ESP/EBP lookahead unit 72 is configured to provide lookahead information as long as the line of instructions provided by decode units 70A–70F do not include more than: (i) two push operations (which decrement the ESP register by a constant value); (ii) two pop operations (which increment ESP register by a constant value); (iii) one move to ESP register; (iv) one arithmetic/logical instruction having the ESP as a destination; or (v) three instructions which update ESP. If one of these restrictions is exceeded, ESP/EBP lookahead unit 72 is configured to stall instructions beyond those which do not exceed restrictions until the succeeding clock cycle (a "split line" case). For those instructions preceded, in the same clock cycle but in earlier issue positions, by instructions which increment or decrement the ESP register, ESP/EBP lookahead unit 72 generates a constant indicating the combined total modification to the ESP register of the preceding instructions. For those instructions preceded by a move or arithmetic operation upon the ESP or EBP registers, ESP/EBP lookahead unit 72 generates a value identifying the issue position containing the move or arithmetic instruction.

The lookahead values may be used by lookahead address/result calculation unit 74 to generate either a lookahead address corresponding to the instruction within the issue position (thereby inhibiting an address generation operation which would otherwise be performed by one of address generation units 34A–34D) or a lookahead result corresponding to the instruction (thereby providing lookahead state to future file 26 earlier in the pipeline). Performance may be increased by removing address generation operations and/or providing lookahead state prior to execution of the instruction operations within functional units 32A–32D and address generation units 34A–34D. Many x86 code sequences include a large number of relatively simple operations such as moves of values from a source to destination without arithmetic/logical operation or simple arithmetic operations such as add/subtract by small constant or increment/decrement of a register operand. Accordingly, functional units 32A–32D may typically execute the more complex arithmetic/logical operations and branch instructions and address generation units 34A–34D may typically perform the more complex address generations. Instruction throughput may thereby be increased.

Immediate field generation unit 73 may be configured to extract immediate data fields from the line of instructions decoded therein (as used herein, the immediate data may be a displacement for use in address generation or immediate data for use in a functional instruction operation). The immediate data is routed to lookahead address/result calculation unit 74. Additionally, decode units 70A–70F are configured to identify register operand specifiers used by the instructions and to route register operand requests to future file 26. Future file 26 returns corresponding speculative register values or result queue tags for each register operand. Intraline dependency check unit 75 provides dependency checking between the line of instructions. Operand collapse unit 78 receives the dependency information generated by intraline dependency check unit 75 for routing appropriate operands for each instruction.

Lookahead address/result calculation unit 74 receives the lookahead values from ESP/EBP lookahead units 72, the immediate data from immediate field generation unit 73, and the speculative register values or result queue tags from future file 26. Lookahead address/result calculation unit 74 attempts to generate either a lookahead address corresponding to a memory operand of the instruction, or a lookahead result if the instruction does not include a memory operand. For example, simple register to register move operations can be completed (with respect to functional units 32 and address generation units 34) by routing the source operand as the destination operand. Move operations employing a memory operation and a register destination can be completed (with respect to functional units 32 and address generation units 34) if an address generation can be performed by lookahead address/result calculation unit 74. In one embodiment, lookahead address/result calculation unit 74 is configured to compute addresses using displacement only, register plus displacement, ESP/EBP plus displacement, and scale-index-base addressing mode except for index or base registers being ESP/EBP. Load/store unit 36 performs the memory operation and returns the memory operation results via result buses 48. Even if no address is generated for a memory operation by lookahead address/result calculation unit 74, lookahead address/result calculation unit 74 indicates the memory operation and corresponding result queue tag to load/store unit 36 to allocate storage within load/store unit 36 for the memory operation.

Simple arithmetic operations which increment or decrement a source operand, add/subtract a small immediate value to a source operand, or add/subtract two register source operands may also be completed via lookahead address/result calculation unit 74 if the source operands are available from future file 26 (i.e. a speculative register value is received instead of a result queue tag). Instructions completed by lookahead address/result calculation units 74 are indicated as completed and are allocated entries in reorder buffer 28 but are not dispatched to instruction windows 30. Lookahead address/result calculation unit 74 may comprise, for example, an adder for each issue position along with corresponding control logic for selecting among the lookahead values, immediate data, and speculative register values. It is noted that simple arithmetic operations may still be forwarded to instruction windows 30 for generation of condition flags, according to the present embodiment. However, generating the functional result in lookahead address/result calculation unit 74 provides the lookahead state early, allowing subsequent address generations/instructions to be performed early as well.

Lookahead address/result calculation unit 74 may be configured to keep separate lookahead copies of the ESP/EBP registers in addition to the future file copies. However, if updates to the ESP/EBP are detected which cannot be calculated by lookahead address/result calculation unit 74, subsequent instructions may be stalled until a new lookahead copy of the ESP/EBP can be provided from future file 26 (after execution of the instruction which updates ESP/EBP in the undeterminable manner).

Dispatch control unit 76 determines whether or not a group of instructions are dispatched to provide pipeline flow control. Dispatch control unit 76 receives instruction counts from instruction windows 30 and load/store counts from load/store unit 36 and, assuming the maximum possible number of instructions are in flight in pipeline stages between dispatch control units 76 and instruction windows 30 and load/store unit 36, determines whether or not space will be available for storing the instructions to be dispatched within instruction windows 30 and/or load/store unit 36 when the instructions arrive therein. If dispatch control unit 76 determines that insufficient space will be available in load/store unit 36 and either instruction window 30, dispatch is stalled until the instruction counts received by dispatch control unit 76 decrease to a sufficiently low value.

Upon releasing instructions for dispatch through dispatch control unit 76, future file 26 and reorder buffer 28 are updated with speculatively generated lookahead results. In one embodiment, the number of non-ESP/EBP updates supported may be limited to, for example, two in order to limit the number of ports on future file 26. Furthermore, operand collapse unit 78 collapses speculatively generated lookahead results into subsequent, concurrently decoded instructions which depend upon those results as indicated by the previously determined intraline dependencies. In this manner, the dependent instructions receive the speculatively generated lookahead results since these results will not subsequently be forwarded from functional units 32A–32D. Those instructions not completed by lookahead address/result calculation unit 74 are then transmitted to one of instruction windows 30A–30B based upon the issue position to which those instructions were aligned by alignment unit 22.

It is noted that certain embodiments of processor 10 may employ a microcode unit (not shown) for executing complex instructions by dispatching a plurality of simpler instructions referred to as a microcode routine. Decode units 75A–70F may be configured to detect which instructions are microcode instructions and to route the microcode instructions to the microcode unit. For example, the absence of a directly decoded instruction output from a decode unit 70 which received a valid instruction may be an indication to the microcode unit to begin execution for the corresponding valid instruction. It is further noted that various storage devices are shown in FIGS. 2 and 3 (e.g. devices 79A, 79B, and similar devices in FIG. 2 and devices 79C, 79D and similar to devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

It is noted that, while the x86 instruction set and architecture has been used as an example above and may be used as an example below, any instruction set and architecture may be used. Additionally, displacements may be any desirable size (in addition to the 8 bit and 32 bit sizes used as examples herein). Furthermore, while cache line fetching may be described herein, it is noted that cache lines may be sectors, and sectors may be fetched, if desirable based upon cache line size and the number of bytes desired to be fetched.

Figure 4:
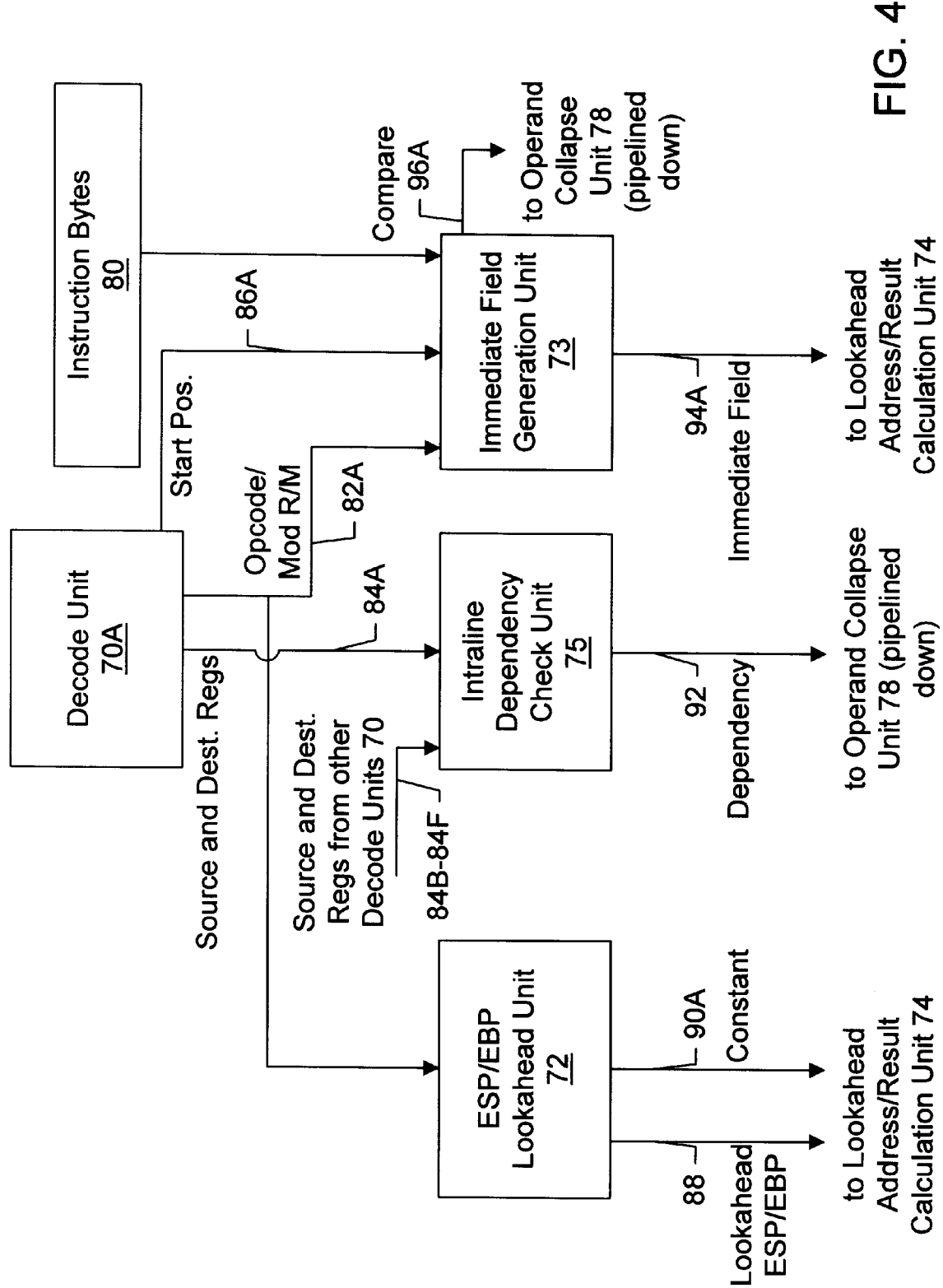
FIG. 4 is a block diagram of portions of the lookahead/collapse unit shown in FIG. 3 illustrating interconnection therebetween.

Turning now to FIG. 4, a block diagram illustrating decode unit 70A, ESP/EBP lookahead unit 72, intraline dependency check unit 75, immediate field generation unit 73, and an instruction bytes storage 80 is shown. Interconnection between the illustrated blocks according to one embodiment of processor 10 is shown in FIG. 4. Other embodiments employing additional, alternative, and/or different interconnection schemes are contemplated. In the embodiment FIG. 4, decode unit 70A is coupled to an opcode/mod R/M bus 82A, a source and destination register specifier bus 84A, and a start position bus 86A. Start position bus 86A and opeode/mod R/M bus 82A are coupled to immediate field generation unit 73 which is further coupled to instruction bytes storage 80. Opcode/mod R/M bus 82A is further coupled to ESP/EBP lookahead unit 72. Source and destination register specifier bus 84A is coupled to intraline dependency check unit 75, which is further coupled to similar source and destination registers specifier buses 84B–84F from other decode units 70. ESP/EBP lookahead unit 72 is coupled to a lookahead ESP/EBP bus 88 and a constant bus 90A which are further coupled to lookahead address/result calculation unit 74. Intraline dependency check unit 75 is coupled to a dependency bus 92 which is further coupled to operand collapse unit 78. Immediate field generation unit 73 is coupled to an immediate field bus 94A and a compare line 96A. Compare line 96A is coupled operand collapse unit 78, and immediate field bus 94A is coupled to lookahead address/result calculation unit 74. Buses and lines referred to with a reference number followed by a letter correspond to the instruction being decoded by decode unit 70A. Similar interconnect may be provided, corresponding to the instructions being concurrently decoded by decode units 70B–70F. For simplicity in the drawing, the interconnect corresponding to the other instructions being concurrently decoded have not necessarily been shown in FIG. 4 (and subsequent figures below). However, similar interconnect to that shown may be provided for the other instructions within the line.

Decode unit 70A decodes an instruction provided by instruction alignment unit 22 and detects the start position of the instruction within the instruction bytes corresponding to the line of instructions concurrently provided by instruction alignment unit 22 to the decode units 70A–70F. The instruction bytes corresponding to the line are stored in instruction storage 80 (which may be a register, for example), and decode unit 70A receives the portion of instruction used by decode unit 70A to perform its decode. In one embodiment, decode unit 70A receives the prefix, opcode, and mod R/M bytes corresponding to the instruction being decoded as well as the start position of the instruction within the instruction bytes corresponding to the line. Other embodiments may receive differing portions of the instruction depending upon the instruction set architecture employed by the embodiment.

Decode unit 70A identifies the source and destination register operand specifiers for the instruction and conveys the specifiers on source and destination register specifier bus 84A. In the present embodiment, an instruction may have up to two source operands and one destination operand. If the instruction includes a memory operand, the source operands may include address operands. Additionally, decode unit 70A conveys the start position of the instruction on start position bus 86A.

ESP/EBP lookahead unit 72 receives the opcode and mod R/M bytes and determines if the corresponding instruction has the ESP or EBP registers as source operands, as well as whether or not the instruction specifies an update of either register. ESP/EBP lookahead unit 72 provides a lookahead ESP and a lookahead EBP value upon lookahead ESP/EBP bus 88. The lookahead register values correspond to the cumulative the results of instructions dispatched prior to the line of instructions being decoded by decode units 70A–70F. Additionally, ESP/EBP lookahead unit 72 generates a constant which is to be added to the lookahead ESP or EBP value to generate a source operand for the instruction being decoded by decode unit 70A. Similar constants may be generated for other instructions within line. The constant for each issue position represents the cumulative effect of the instructions prior to and including the instruction corresponding to that issue position within the line. In the case of decode unit 70A, there are no instructions prior to the instruction within the line, and hence the constant corresponds to a modification to the corresponding register which is performed prior to using the value as a source operand for the instruction. For example, the PUSH instruction defined by the x86 instruction set architecture specifies that the ESP register value is decremented prior to using the value as an address operand for the instruction.

Intraline dependency check unit 75 receives the source and destination register specifiers from decode unit 70A as well as from other decode units 70B–70F. Intraline dependency check unit 75 performs a dependency check for each source operand corresponding to an instruction within a particular issue position against the destination operands of each prior instruction within line. If a dependency is detected, a corresponding indication upon dependency bus 92 is provided. Accordingly, dependency bus 92 includes an indication for each possible source operand indicating whether or not a dependency is detected for that source operand as well as which issue position the source operand is dependent upon. For example, dependency bus 92 may include a dependency signal corresponding to each source operand as well as an issue position number corresponding to each source operand.

Immediate field generation unit 73 decodes the opcode and mod R/M bytes of the instruction to determine if an immediate field is included in the instruction. Immediate field generation unit 73 extracts the immediate field from instruction bytes storage 80 and provides immediate field upon immediate field bus 94A. In one embodiment, immediate fields of various sizes are supported (e.g. 8 bit and 32-bit). Immediate field generation unit 73 may be configured to sign extend or zero extend the smaller immediate fields to the size of the largest supported immediate field as appropriate. Additionally, if the instruction is an increment/decrement instruction, immediate field generation unit 73 may be configured to generate a constant for the immediate field reflecting the size of the increment/decrement. If the instruction does not include an immediate field and is not an increment/decrement instruction, immediate field generation unit 73 may be configured to generate a zero value upon immediate field bus 94A. Immediate field generation unit 73 may further be configured to perform similar operations corresponding to instructions within other decode units 70. Immediate field generation unit 73 selects the immediate field from instruction bytes storage 80 according to the start position provided by decode unit 70A and a decode of the opcode and mod R/M bytes.

In the present embodiment, instruction bytes storage 80 stores the instruction bytes corresponding to the line of instructions being concurrently decoded. The instructions bytes are pipelined with the line of instructions, allowing various fields of the instruction to be extracted as desired. In other embodiments, the instructions may be entirely routed with in each issue position (instead of routing a subset of the instructions and pointers to the instructions within instruction bytes storage 80).

In the present embodiment, immediate field generation unit 73 is further configured to detect a compare instruction within a particular issue position, followed by a branch instruction in the immediately subsequent issue position which depends upon the compare result (i.e. a conditional branch instruction). Upon detecting such a combination, immediate field generation unit 73 asserts a compare indication to operand collapse unit 78. In other embodiments, a separate control unit can be provided to detect the compare/branch combination, or one of the other units may be configured to provide the functionality. Furthermore, embodiments are contemplated in which the compare/branch combination is not detected. Operand collapse unit 78 may be configured to collapse the compare operation and the branch operation into one issue position (i.e. one functional unit may perform both the compare operation and the dependent branch operation concurrently).

It is noted that, in FIG. 4, certain outputs of the units shown are described as being pipelined down to, e.g., operand collapse unit 78. This is intended to indicate that these outputs are generated and are conveyed with the corresponding instruction through the pipeline to the receiving unit. Alternatively, these outputs could be captured by the receiving unit and associated with the corresponding instruction upon arrival of the instruction therein.

Figure 5:
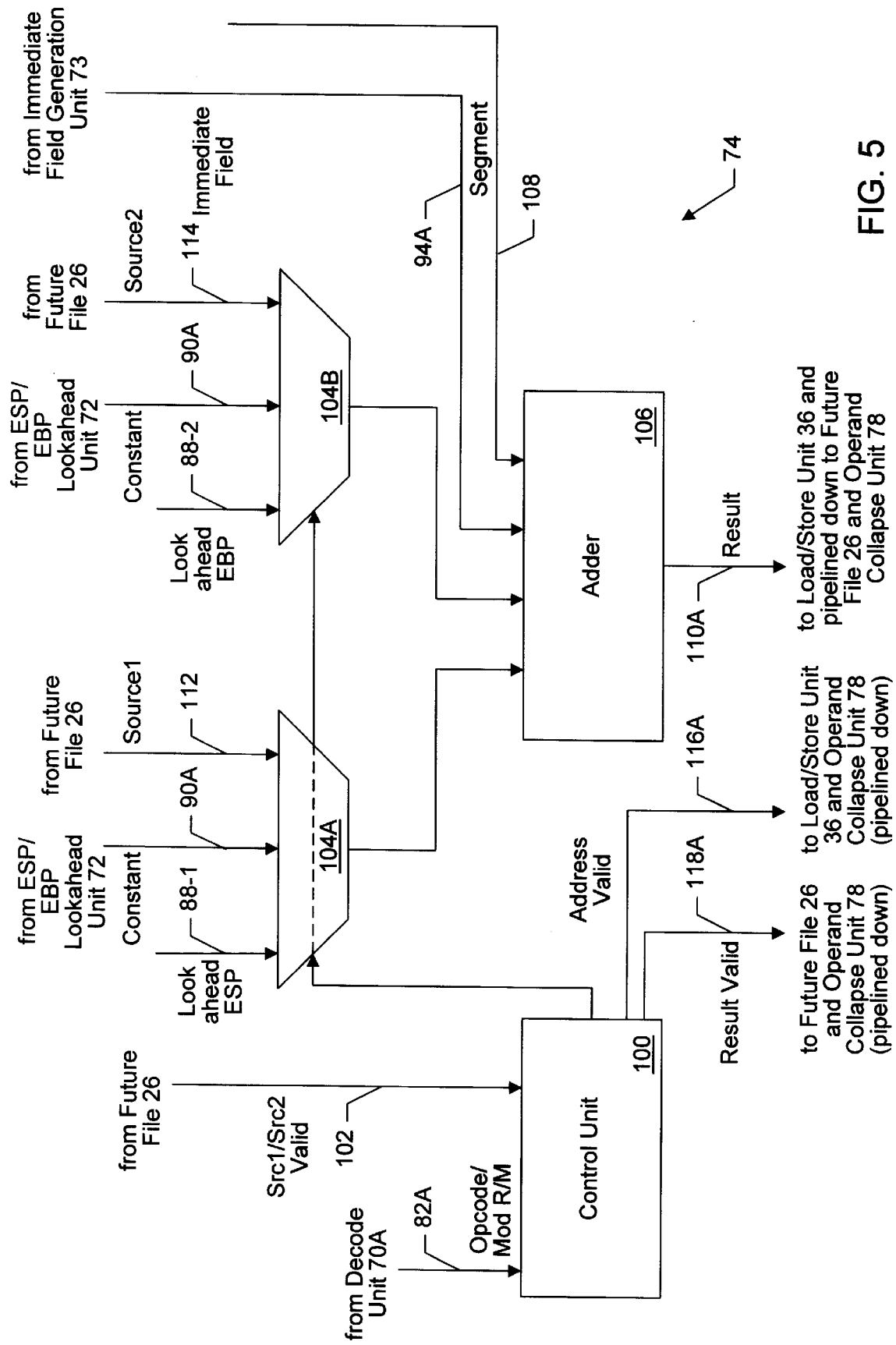
FIG. 5 is a diagram illustrating a portion of one embodiment of a lookahead address/result generation unit shown in FIGS. 3 and 4.

Turning now to FIG. 5, a portion of one embodiment of lookahead address/result calculation unit 74 is illustrated. Other embodiments are possible and contemplated. In the embodiment of FIG. 5, a portion of lookahead address/result calculation unit 74 corresponding to issue position 0 (i.e. corresponding to decode unit 70A) is illustrated. Similar hardware may be provided for the other issue positions as well. A control unit 100 is shown coupled to opcode/mod R/M bus 82A pipelined down from decode unit 70A. Control unit 100 is also coupled to receive valid indications corresponding to the source operands of the instruction as provided by future file 26 via a bus 102. A source operand is valid in future file 26 if the source operand is provided instead of a result queue tag indicating the instruction which will produce the source operand upon execution. Control unit 100 is coupled to provide selection controls to operand select to multiplexors (muxes) 104A and 104B. Operand select mux 104A is coupled to a lookahead ESP bus 88-1 (a portion of lookahead ESP/EBP bus 88 which provides the lookahead ESP value), constant bus 90A, and a source 1 bus 112 from future file 26. Operand select mux 104B is coupled to a lookahead EBP bus 88-2 (a portion of lookahead ESP/EBP bus 88 which provides the lookahead EBP value), constant bus 90A and a source 2 bus 114 from future file 26. An adder 106 is shown coupled to operand select muxes 104 as well as immediate field bus 94A and a segment bus 108. Adder 106 provides a result upon a result bus 110A provided to load/store unit 36, future file 26, and operand collapse unit 78. Control unit 100 produces an address valid signal upon an address valid line 116A to load/store unit 36 and operand collapse unit 78 and a result valid signal upon a result valid line 118A to future file 26 and operand collapse unit 78. It is noted that, as discussed above, connections listed with a reference numeral followed by a letter may be repeated for instructions in other issue positions (not shown in FIG. 5).

Control unit 100 is configured to decode the opcode and mod R/M bytes of the instruction to determine whether to perform a lookahead address generation (for instructions including a memory operand), a lookahead result generation (for instructions excluding a memory operand and performing an additive instruction operation or a move instruction operation), or neither. Control unit 100 may select operands via operand select muxes 104 according to a decode of the instruction. Adder 106 is configured to add: (i) the values provided by operand select muxes 104A and 104B; the immediate value provided upon immediate field bus 94A, (iii) and the segment base address provided upon segment bus 108 to produce the result. For result generations (as opposed to address generations) the segment value may be zero or may be ignored by adder 106 responsive to a control signal from control unit 100 (not shown).

Figure 6:
FIG. 6 is a truth table according to one embodiment of a control unit shown in FIG. 5 for lookahead address generation.

For example, the truth table 120 illustrated in FIG. 6 may be employed for one embodiment of control unit 100 to select values the operand select muxes 104 if the instruction includes an address generation instruction operation for a memory operand. Truth table 120 includes an addressing mode column indicating the addressing mode employed by the instruction to generate the address of the memory operand, a mux 1 column indicating the value selected by operand select mux 104A responsive to controls from control unit 100, and a mux 2 column indicating the value selected by operand select mux 104B responsive to controls from control unit 100. Other embodiments are possible and contemplated. The embodiment illustrated in FIG. 6 supports the following addressing modes: (i) displacement only;

(ii) combinations of an optional displacement and one or two address operands (not including the ESP or EBP registers); or (iii) the ESP or EBP registers as a source operand along with an optional displacement. It is noted that a scale factor may be included in the scale-index-base addressing modes specifiable in the x86 instruction set architecture. Mux 104A may be configured to scale the source 1 operand by selecting the source 1 operand shifted left by one or two bits. It is further noted that the displacement shown in FIG. 6 is provided upon immediate bus 94A in the present embodiment.

Depending upon the addressing mode specified by the instruction, control unit 100 examines the valid indications from future file 26 and determines if adder 106 successfully generates the address of the memory operand. In other words, if each source operand which is an address operand is valid, adder 106 may successfully generate the address. If the address is successfully generated, control unit 100 asserts the address valid signal upon the address valid line 116A to indicate to load/store unit 36 that the address provided upon result bus 110A is to be captured and used as the address of the memory operand for the corresponding instruction. If the address is not successfully generated, address generation units 34 may be used to generate the address subsequently and the address may then be forwarded to load/store unit 36.

Segment bus 108 provides a segment base address according to the segmentation translation mechanism defined by the x86 instruction set architecture. Other embodiments for processors employing other instruction set architectures may eliminate segment bus 108. The segment base address provided on segment bus 108 is the segment base address of the selected segment corresponding to the instruction within the current issue position. Alternatively, each available segment base address may be provided and selected according to the corresponding instruction. Segment information may be maintained in an appropriate translation unit or special register unit as is well-known in the art.

If the instruction in the current issue position does not include a memory operand, control unit 100 may attempt to select operands to generate a lookahead result for the instruction. In the present embodiment, control unit 100 may support an add/subtract or increment/decrement operation involving one or to source operands and/or an immediate value. Control unit 100 may also support register—register moves by providing be second source operand as the sole input to adder 106.

Figure 7:
FIG. 7 is a truth table according to one embodiment of a control unit shown in FIG. 5 for lookahead result generation.

For example, one embodiment of control unit 100 may operate according to the truth table 122 illustrated in FIG. 7. Other embodiments are possible contemplated. Truth table 122 as shown in FIG. 7 includes an arithmetic operation column indicating the arithmetic operations supported by lookahead address/result calculation unit 74 according to the present embodiment. Similar to truth table 120 shown in FIG. 6, truth table 122 includes a mux 1 column indicating the operand selected by operand select mux 104A and a mux 2 column indicating the operand selected by operand select mux 104B in response to respective controls from control unit 100. According to the table, and add or subtract of one (if zero is selected through mux 104B) or two source operands and an optional immediate field may be supported as well as and increment or decrement and a register—register move.

Control unit 100 is configured to determine if adder 106 successfully produces a lookahead result upon result bus 110A. Control unit 100 determines that a successful result has been produced if each of the source operands used to generate a result are valid as indicated by future file 26 and the functional instruction operation specified by the instruction is one which is supported by lookahead address/result calculation unit 74. If the result is determined to be successfully produced, control unit 100 asserts a result valid signal upon result valid line 118A to future file 26 and operand collapse unit 78. Future file 26 may be configured to store the result according to the destination register of the instruction (which may also be provided upon result bus 110A). Operand collapse unit 78 may be configured to collapse the result into a source operand of a dependent instruction (according to dependency indications provided by intraline dependency check unit 75).

Figure 8:
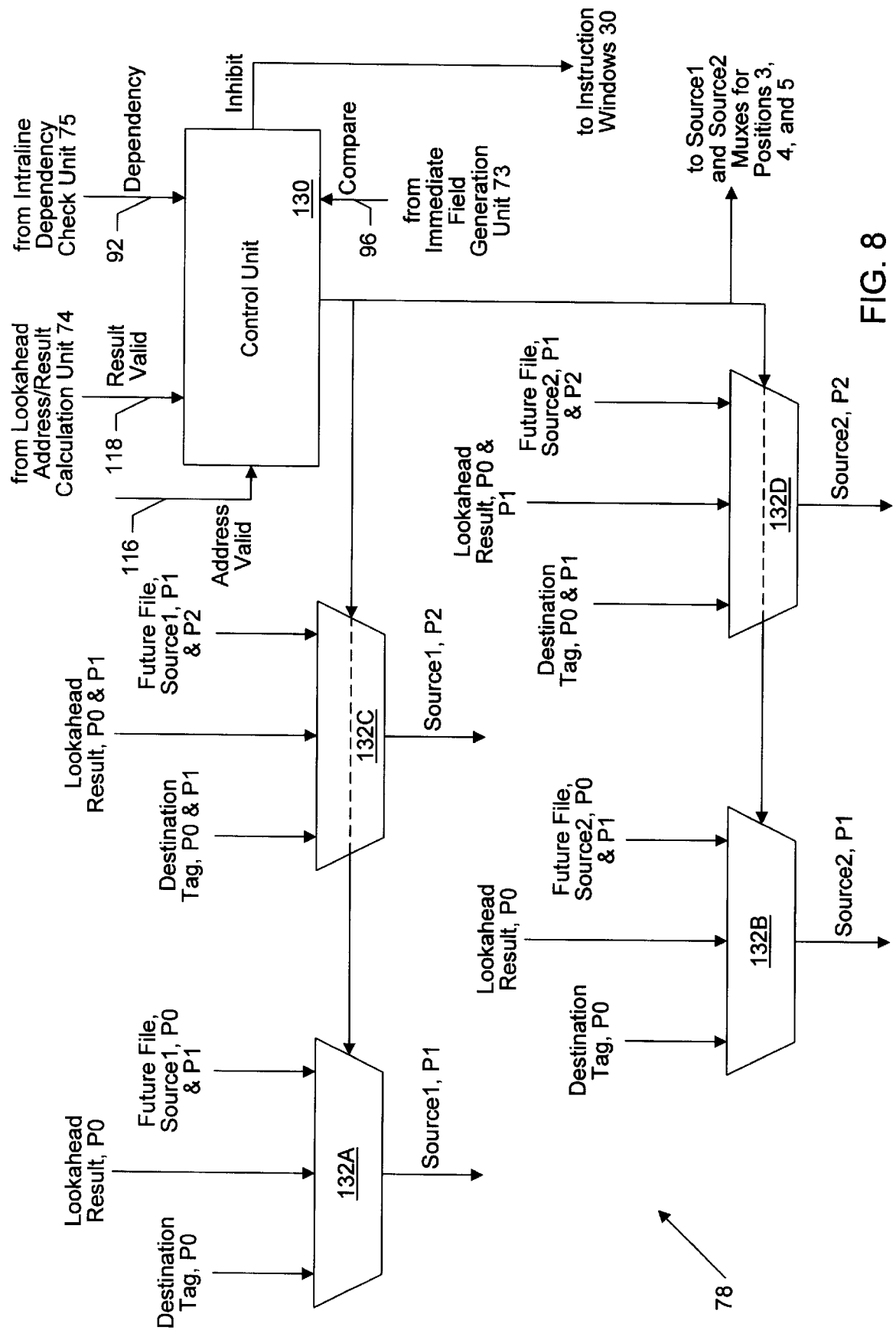
FIG. 8 is a block diagram of a portion of one embodiment of an operand collapse unit shown in FIG. 3.

Turning next to FIG. 8, a block diagram illustrating a portion of one embodiment of operand collapse unit 78 is shown. Other embodiments are possible and contemplated. In the portion illustrated in FIG. 8, a control unit 130 is shown along with operand collapse muxes 132A–132D. Control unit 130 is coupled to a plurality of result valid lines 118 (including result valid line 118A shown in FIG. 5), a plurality of address valid lines 116 (including address valid line 116A shown in FIG. 5), dependency bus 92 from intraline dependency check unit 75, a plurality of compare lines 96 (including compare line 96A shown in FIG. 4) and an inhibit bus 134. Control unit 130 is further coupled to provide selection controls to each of collapse muxes 132 (as well as collapse muxes for other issue positions not shown in FIG. 8). Each of collapse muxes 132A–132D corresponds to one source operand within one issue position. Each of collapse muxes 132A–132D are coupled to receive the destination tags corresponding to the prior issue positions within the line, as well as the lookahead results corresponding to those issue positions. Furthermore, each of collapse muxes 132A–132D are coupled to receive the future file output for the source operand of the instruction within the issue position immediately prior to the issue position corresponding to that collapse mux 132A–132D and the source operand of the instruction within the issue position corresponding to that collapse mux 132A–132D. For example, collapse mux 132A provides the source 1 operand for issue position 1 and is coupled receive: (i) the destination tag for the instruction within issue position 0; (ii) the lookahead result provide upon result bus 110A corresponding to issue position 0; and (iii) the source 1 operands from future file 26 corresponding to the source 1 operand of issue position 0 and the source 1 operand of issue position 1. As illustrated in FIG. 8, the capital letter P followed by a number indicates the issue position corresponding to the value indicated (i.e. P0 is issue position 0, P1 is issue position 1, etc.).

As described above, operand collapse unit 78 collapses the lookahead results generated by lookahead address/result calculation unit 74 into source operands of the dependent instructions within the line. In the embodiment shown in FIG. 8, an operand collapse mux 132 is provided for each source operand and each issue position for which a collapse may be performed. Accordingly, no operand collapse muxes are shown for issue position 0 because issue position 0 is the first issue position within the line and hence may not experience and intraline dependency. Operand collapse muxes 132A and 132B provide the source operands for issue position 1, while operand collapse muxes 132C and 132D provide the source operands for issue position 2. Similar operand class muxes provide the source one source to operands for issue positions 3,4, and 5 (not shown in FIG. 8).

Control unit 130 receives indications of which results are valid via result valid lines 118 and indications of the intraline dependencies upon dependency bus 92. If a dependency is noted for a particular source operand in a particular issue position via dependency bus 92 and the result is valid as indicated by the result valid line 118 for the issue position upon which the source operand is dependent, control unit 130 may control a corresponding operand collapse mux 132 to select the result from the corresponding lookahead result bus. On the other hand, if a dependency is noted that the corresponding result is not valid, then control unit 130 may control a corresponding operand collapse mux 132 to select the destination tag of the issue position upon which the source operand is dependent. Control unit 130 further receives the compare signals on compare lines 96 indicating that a compare/branch has been detected. If a compare/branch combination has been detected, control unit 130 selects the future file output for the source operands of the previous issue position for the operand collapse muxes 132 of the issue position containing the branch instruction. In this manner, the source operands of the compare instruction may be provided into the issue position having the branch instruction. Subsequently, the receiving functional unit can perform both the compare (using the compare source operands) and determine the branch instruction taken or not taken as result of the compare. If no dependency is noted for a particular source operand of a particular issue position and the issue position is not the branch portion of a compare/branch combination, control unit 130 may control the corresponding operand collapse mux 132 to select the future file output for that source operand in that issue position (which may be a result queue tag or a valid source operand).

An additional check which control unit 130 may perform is to determine, in a case in which a particular source operand in a particular issue position is indicated dependent upon a prior issue position for which a result is indicated valid by lookahead address/result calculation unit 74. If the prior issue position has an intraline source dependency indicated, then the result provided by lookahead address/result calculation unit 74 is actually invalid (because it is based on an incorrect source operand). In such cases, control unit 130 may inhibit selection of the lookahead result provided by lookahead address/result calculation unit 74 and instead select the destination tag corresponding to the prior issue position. In one implementation, control yet 130 may mask the result valid signals with the corresponding dependency indications from dependency bus 92 such that the masked result valid signals are reset if a dependency is indicated within the corresponding issue position. It is noted that future file 26 and load/store unit 36 may invalidate lookahead results/addresses in a similar fashion.

Control unit 130 may further be configured to signal instruction windows 30 via inhibit bus 134. For each instruction operation completed by lookahead address/result calculation unit 74 (either address generation or functional operation) control unit 130 may inhibit the corresponding operation within instruction windows 30 such that the instruction operation is not selected for execution by a functional unit 32 or address generation unit 34. For example, inhibit bus 134 may include an inhibit address generation signal and an inhibit functional operation signal for each issue position. Control unit 130 may activate the inhibit address generation signal for a particular issue position if lookahead address/result calculation unit 74 successfully generated the lookahead address for that particular issue positions (including the effects of any intraline dependencies). On the other hand, control unit 130 may activate the inhibit functional operation signal if lookahead address/result calculation unit 74 successfully generated the lookahead result corresponding to that particular issue position (including the effects of any intraline dependencies). Additionally, control unit 130 may activate the inhibit functional operation signal if the particular issue position is storing the compare portion of a compare/branch combination. As mentioned above, arithmetic operations may include a flag generation in addition to the functional operation of the arithmetic instruction. Such instructions may not be inhibited to allow for the generation of the flag result even though the functional result is already generated. Alternatively, the functional result may not be inhibited to provide forwarding to instructions which may have read future file 26 prior to future file 26 being updated with the lookahead result. Otherwise, local forwarding within the pipeline stages between reading the future file and providing the lookahead results may be performed. Control unit 130 receives the address valid signals in order to generate the inhibit address generation signals. Still further, control unit 130 may be configured not to inhibit a functional operation if the corresponding instruction updates the condition codes as well as a result register. The functional operation may thereby be passed to a functional unit for calculation of the condition codes.

Figure 9:
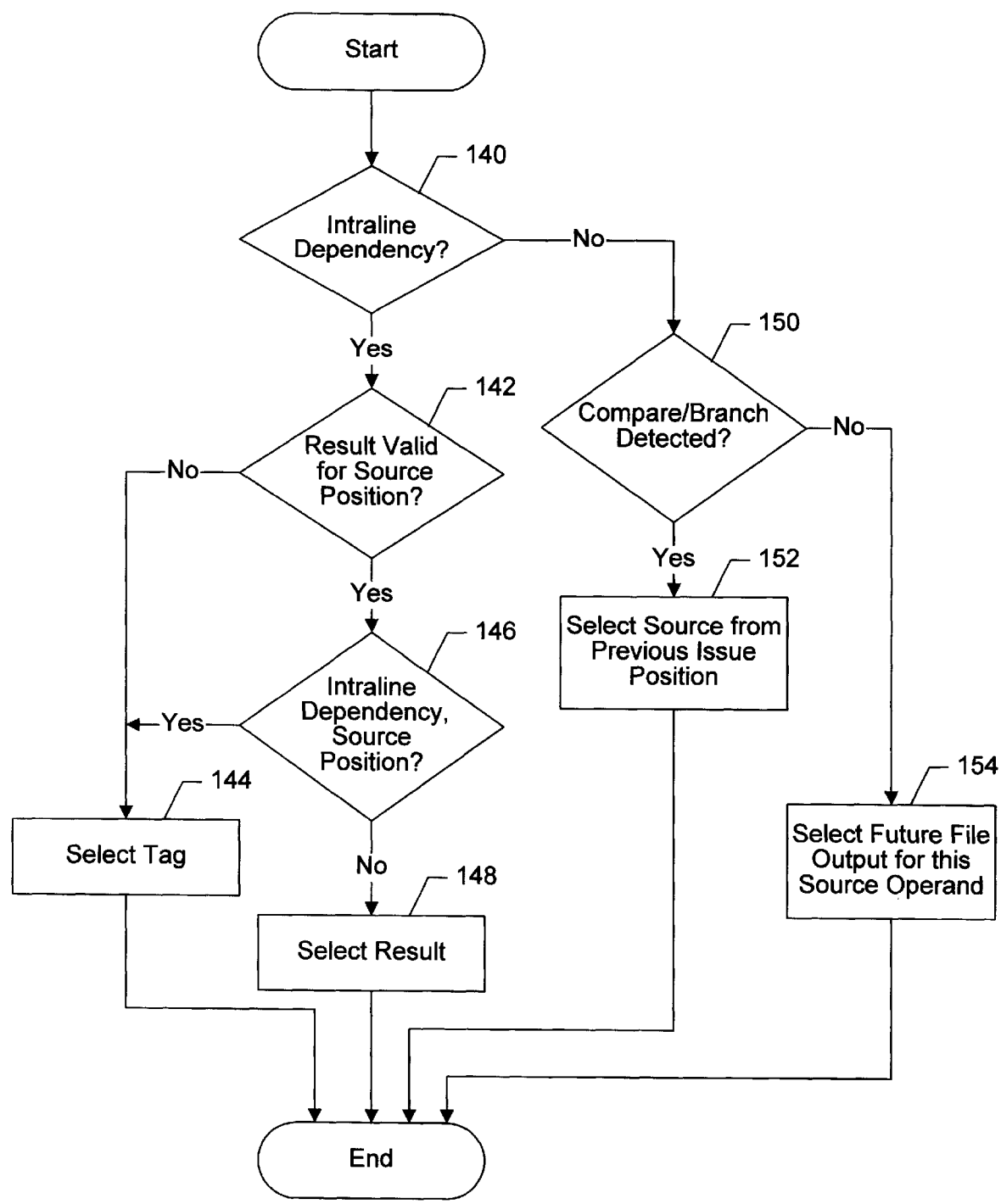
FIG. 9 is a block diagram of a flowchart illustrating one embodiment of a control unit illustrated in FIG. 8.

Turning next to FIG. 9, a flowchart is shown illustrating operation of one embodiment of control unit 130 for selecting a particular source operand for a particular issue position. Other embodiments are possible and contemplated. The steps shown in FIG. 9 may be performed for each source operand in parallel. The steps shown in FIG. 9 are shown in a particular order for ease of understanding, but may be performed in any suitable order. Furthermore, the steps may be performed in parallel as desired in the logic within control unit 130.

Control unit 130 determines if there is and intraline dependency noted for the particular source operand (decision block 140). If an intraline dependency is noted, control unit 130 determines if lookahead address/result calculation unit 74 successfully generated a lookahead result for the prior issue position upon which the particular source operand is dependent (decision block 142). If a lookahead result was not successfully generated, control unit 130 selects the destination tag corresponding to the prior issue position (step 144). Additionally, if the result is valid within the prior issue position but an intraline dependency is noted for one or more of the source operands for the prior issue position (decision block 146), control unit 130 selects the destination tag corresponding to the prior issue position as well (step 144). If there is no dependency noted for the source operands of the prior issue position and the result is valid, control yet 130 selects the result provided by lookahead address/result calculation unit 74 (step 148).

If no intraline dependency is noted for the particular source operand (decision block 140), control unit 130 determines if a compare/branch combination has been detected for which the particular issue position is the branch portion (decision block 150). If the compare/branch combination has been detected the source operand from the preceding issue position (i.e. the issue position containing the compare instruction) is selected by control unit 130 (step 152). On the other hand, if the compare/branch combination has not been detected, control unit 130 selects the future file output for the particular source operand (step 154).

It is noted that, while various features are illustrated above as muxes, any parallel or serial combination of selection logic may be used to perform the described selections. It is further noted that, while the present embodiment provides collapse for intraline results and compare/branch combination, embodiments which provide only one of these features are also contemplated. It is still further noted that, while a future file is used as a source for operands in the present embodiment, other embodiments may employ other speculative storage elements such as reorder buffers, rename register files, etc. as a source for operands.

Figure 10:
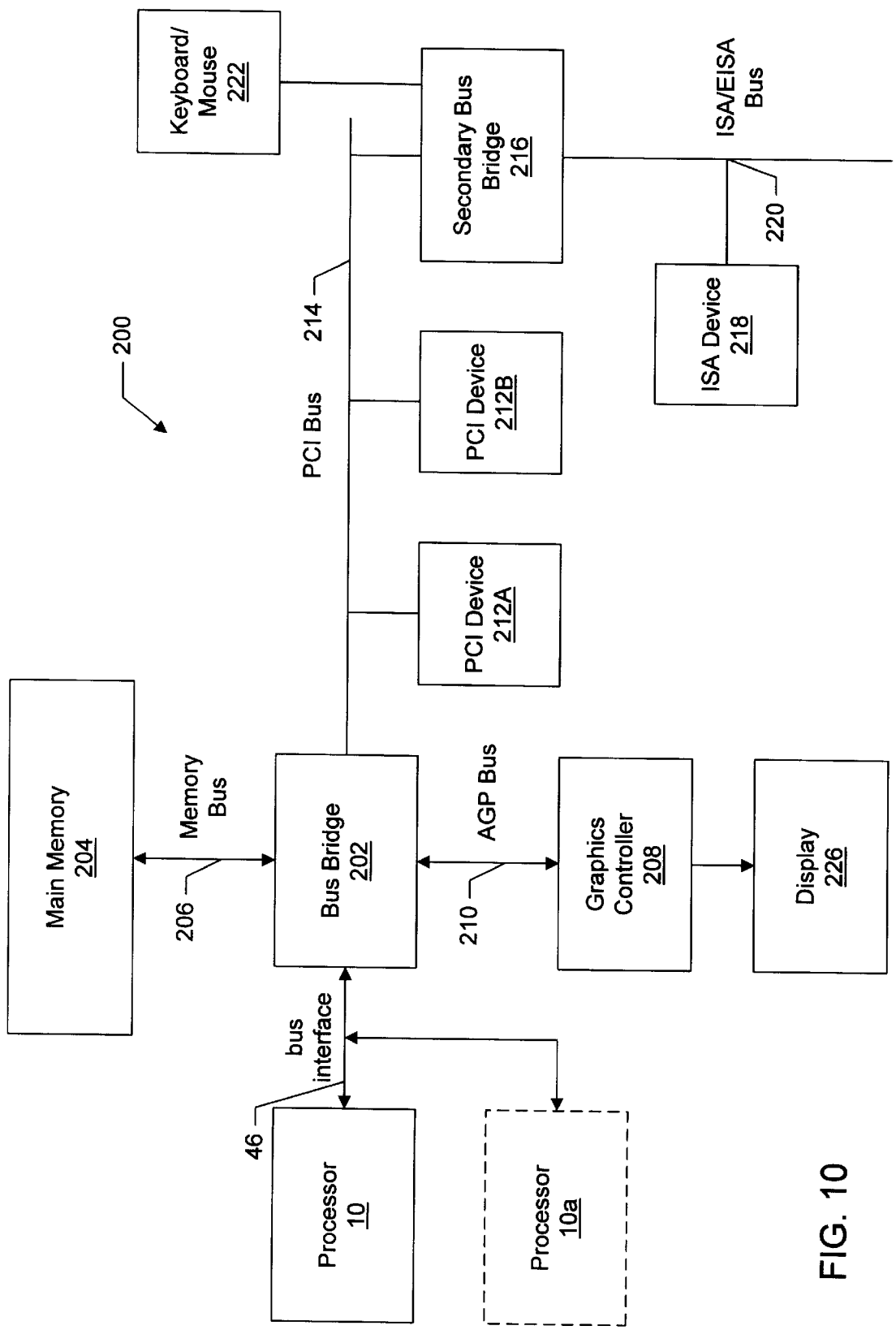
FIG. 10 is a block diagram of a computer system including the processor shown in FIG. 1.

Turning now to FIG. 10, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 10) or may be connected to bus bridge 202 via an independent bus.

In accordance with the above disclosure, a processor has been shown which attempts to generate lookahead addresses and/or results prior to execution of the instructions. Intraline dependencies are noted, and the lookahead results are collapsed into source operands of the dependent instructions. Forwarding may be more efficient by providing the lookahead results early (providing forwarding via a future file and the collapse mechanism). Furthermore, fewer functional units may be supported by requiring fewer instruction operations to be executed in the functional units.

Numerous variations and modifications will become apparent to those skilled in the art once the above disclosure is fully appreciated. It is intended that the following claims be interpreted to embrace all such variations and modifications.

What is claimed is:

1. A processor comprising:
   an intraline dependency check unit coupled to receive a plurality of operand specifiers corresponding to a line of instructions, wherein said intraline dependency check unit is configured to determine dependencies between instructions within said line of instructions by comparing said plurality of operand specifiers;
   a lookahead calculation unit coupled to receive one or more operands specified by said plurality of operand specifiers, wherein said lookahead calculation unit is configured to calculate a lookahead result corresponding to a first instruction within said line of instructions if each operand used by said first instruction to generate said lookahead result are within said one or more operands;
   an operand collapse unit coupled to said lookahead calculation unit and said intraline dependency check unit, wherein said operand collapse unit is configured to provide said lookahead result as an operand of a second instruction within said line of instructions responsive to: (i) an indication from said lookahead calculation unit that said lookahead result is valid, and (ii) an indication from said intraline dependency check unit that said second instruction is dependent upon said first instruction; and
   one or more instruction windows coupled to said operand collapse unit, wherein said one or more instruction windows are configured to store instructions until corresponding operands are provided and to subsequently select said instructions for execution;

wherein said operand collapse unit is configured to signal said one or more instructions windows to inhibit execution of at least a first instruction operation of said first instruction represented by said lookahead result if said lookahead result is valid.

2. The processor as recited in claim 1 wherein said lookahead calculation unit is configured to calculate said lookahead result if said instruction is a move instruction having only register operands, and wherein said move instruction comprises said first instruction operation inhibited from said one or more instruction windows.

3. The processor as recited in claim 1 wherein said lookahead calculation unit is configured to calculate said lookahead result if said instruction is an additive instruction having only register source operands.

4. The processor as recited in claim 3 wherein said additive instruction is provided to said one or more instruction windows for subsequent execution to produce a flags result, and wherein said first instruction operation comprises said additive operation.

5. The processor as recited in claim 3 wherein said lookahead calculation unit is configured to calculate a lookahead address if said first instruction includes a memory operand and said one or more operands include one or more address operands corresponding to said first instruction, and wherein said first instruction operation comprises said address generation.

6. The processor as recited in claim 3 further comprising a load/store unit coupled to said lookahead calculation unit, wherein said load/store unit is configured to receive said lookahead address as an address of said memory operand responsive to an indication from said lookahead calculation unit that said lookahead address is valid, and wherein said operand collapse unit is configured to disable an address generation corresponding to said first instruction upon providing said line of instructions to said one or more instruction windows.

7. The processor as recited in claim 6 further comprising an address generation unit coupled to said one or more instruction windows, wherein said address generation unit is configured to generate said address if said lookahead address is invalid.

8. The processor as recited in claim 1 further comprising a functional unit coupled to said one or more instruction windows, wherein said functional unit is configured to execute instructions provided thereto by said one or more instruction windows.

9. The processor as recited in claim 8 wherein said functional unit does not execute said portion of said first instruction represented by said lookahead result if said lookahead result is valid.

10. The processor as recited in claim 9 further comprising a future file coupled to said lookahead calculation unit, wherein said future file is configured to provide said one or more operands to said lookahead calculation unit responsive to said plurality of operand specifiers.

11. The processor as recited in claim 10 wherein said future file is coupled to receive said lookahead result and to update a destination operand corresponding to said lookahead result in response thereto.

12. The processor as recited in claim 11 wherein said future file is coupled to said functional unit, wherein said future file is configured to update said destination operand corresponding to an execution result provided therefrom.

13. The processor as recited in claim 1 wherein said operand collapse unit is configured to provide operands corresponding to said first instruction as operands of said second instruction if said first instruction is a compare instruction, said second instruction is a conditional branch instruction, and said second instruction is consecutive to said first instruction.

14. The processor as recited in claim 13, wherein said operand collapse unit is further configured to inhibit said one or more instruction windows from receiving said compare instruction.

15. A processor comprising:

an operand collapse unit coupled to receive a plurality of operands corresponding to a line of instructions, wherein said operand collapse unit is configured to provide one or more of said plurality of operands corresponding to a first instruction within said line of instructions as operands of a second instruction within said line of instructions if: (i) said first instruction is a compare instruction, (ii) said second instruction is a conditional branch instruction, and (iii) said second instruction is consecutive to said first instruction; and one or more instruction windows coupled to said operand collapse unit, wherein said one or more instruction windows are configured to store instructions until corresponding operands are provided and to subsequently select said instructions for execution;

wherein said operand collapse unit is configured to signal said one or more instructions windows to inhibit receipt of said first instruction if: (i) said first instruction is a compare instruction, (ii) said second instruction is a conditional branch instruction, and (iii) said second instruction is consecutive to said first instruction.

16. A method for executing a line of instructions in a processor, the method comprising:

decoding said line of instructions to detect a plurality of operand specifiers;

comparing destination operand specifiers of each instruction within said line of instructions to source operand specifiers of each subsequent instruction within said line of instructions to detect intraline dependencies;

reading a speculative operand source to capture source operands specified by said source operand specifiers;

calculating a lookahead result for a first instruction within said line if said source operands are available in said speculative operand source, said calculating performed in a lookahead calculation unit;

signalling an instruction window configured to receive said first instruction to inhibit execution of at least a first instruction operation of said first instruction which produces said lookahead result if said lookahead result is successfully calculated; and providing said lookahead result to a second instruction within said line of instructions if said comparing indicates a dependency of said second instruction upon said first instruction, said providing performed prior to storing said second instruction in said instruction window, said providing performed by an operand collapse unit.

17. The method as recited in claim 16 further comprising selecting said second instruction from said instruction window for execution.

18. The method as recited in claim 16 wherein said calculating is successful if said instruction is an additive instruction having only register operands and each of said register operands is available in said speculative operand storage upon said reading.

19. The method as recited in claim 18 further comprising calculating a lookahead address if said first instruction includes a memory operand and address operands corresponding to said first instruction are available in said speculative operand source upon said reading.

20. A computer system comprising:
a processor including:
an alignment unit configured to align a line of instructions to a plurality of issue positions;
a speculative operand source configured to store speculative operands;
an instruction window configured to store instructions until operands are provided for those instructions; and
a lookahead/collapse unit coupled to said speculative operand source, said instruction window, and said alignment unit, wherein said lookahead/collapse unit is configure to read operands from said speculative operand source responsive to said line of instructions received from said alignment unit, and wherein said lookahead/collapse unit is configured to generate a lookahead result corresponding to a first instruction within said line of instructions responsive to said operands, and wherein said lookahead/collapse unit is further configured to update said speculative operand source with said lookahead result, and wherein said lookahead/collapse unit is configured to forward said lookahead result to a second instruction within said line of instructions which is dependent upon said first instruction, and wherein said lookahead/collapse unit is configured to signal said instruction window to inhibit execution of at least a first instruction operation of said first instruction which produces said lookahead result; and
an input/output (I/O) device coupled to said processor, wherein said I/O device is configured to communicate between said computer system and another computer system to which said I/O device is coupled.

21. The computer system as recited in claim 20 further comprising a second processor including:
an alignment unit configured to align a line of instructions to a plurality of issue positions;
a speculative operand source configured to store speculative operands;
an instruction window configured to store instructions until operands are provided for those instructions; and
a lookahead/collapse unit coupled to said speculative operand source, said instruction window, and said alignment unit, wherein said lookahead/collapse unit is configure to read operands from said speculative operand source responsive to said line of instructions received from said alignment unit, and wherein said lookahead/collapse unit is configured to generate a lookahead result corresponding to a first instruction within said line of instructions responsive to said operands, and wherein said lookahead/collapse unit is further configured to update said speculative operand source with said lookahead result, and wherein said lookahead/collapse unit is configured to forward said lookahead result to a second instruction within said line of instructions which is dependent upon said first instruction, and wherein said lookahead/collapse unit is configured to signal said instruction window to inhibit execution of at least a first instruction operation of said first instruction which produces said lookahead result.

* * * * *